United States Patent [19]

Kiguchi

[11] Patent Number: 4,639,553
[45] Date of Patent: Jan. 27, 1987

[54] CALL SIGNAL DETECTING DEVICE
[75] Inventor: Masao Kiguchi, Atsugi, Japan
[73] Assignee: Ricoh Company, Ltd., Tokyo, Japan
[21] Appl. No.: 721,406
[22] Filed: Apr. 9, 1985
[30] Foreign Application Priority Data Apr. 9, 1984 [JP] Japan .................................. 59-69245

[51] Int. Cl.$^4$ .............................................. H04N 1/32
[52] U.S. Cl. .................................... 379/377; 358/257; 379/94; 379/100; 379/386
[58] Field of Search ................. 179/84 A, 84 R, 81 R, 179/2 A, 84 VF, 2 C, 2 DP; 358/257

[56] References Cited

U.S. PATENT DOCUMENTS 3,914,539 10/1975 Hashimoto ........................... 358/257
4,249,216 2/1981 Kanda ................................. 358/257
4,346,410 8/1982 Maeno ................................. 358/257

Primary Examiner—James L. Dwyer
Attorney, Agent, or Firm—Oblon, Fisher, Spivak, McClelland, & Maier

[57] ABSTRACT

In a facsimile communication system, a call signal detecting device for identifying call signals which are received over a network. Both an unsounding call signal and a sounding call signal are detected by a single detection circuitry, which is also responsive to off-hooking of an own station's telephone set. Detection of such signals is implemented by the measurement of a period which is performed by a processing unit, so that changes in the specifications of the signals to be detected can be accommodated merely by modifying a program of the processing system and not the hardware of the device.

3 Claims, 4 Drawing Figures

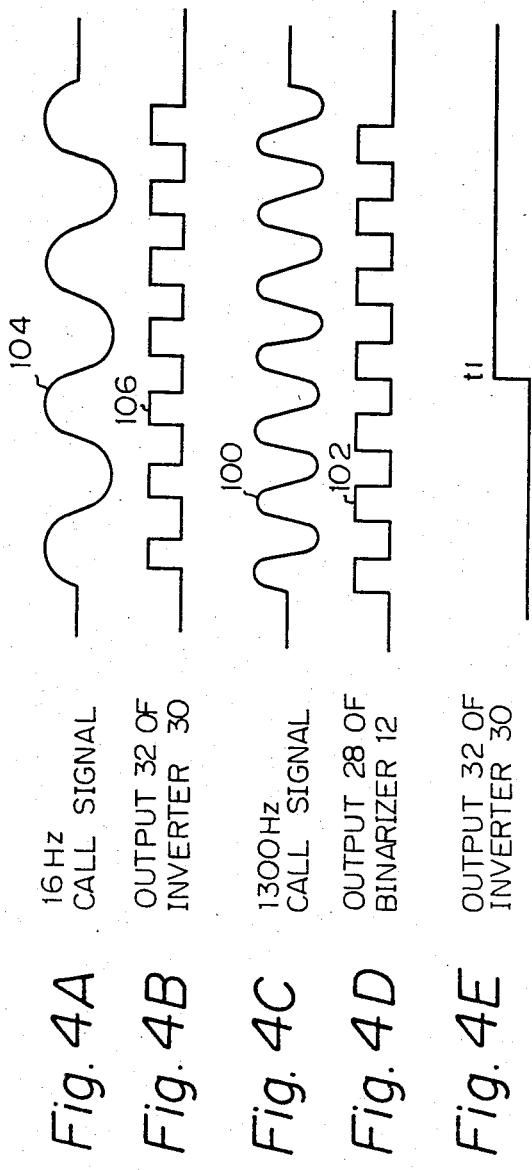

CALL SIGNAL DETECTING DEVICE

BACKGROUND OF THE INVENTION

1. Field of the invention

The present invention relates to a call signal detecting device and, more particularly, to a call signal detecting device applicable to a facsimile communication system for identifying call signals which come in from a network.

2. Description of the Background

A public switched telephone network uses a call signal to be received by a subscriber which is generally implemented by a 16-hertz high-voltage call signal, for example. A facsimile communication network, on the other hand, uses a facsimile call signal which may comprise a 1,300-hertz unsounding call signal. Preferably, therefore, a facsimile apparatus connected to such networks and furnished with an automatic call incoming function should be constructed to identify both of sounding call incoming and unsounding call incoming and, yet, to clearly discriminate them from off-hooking and subsequent dialing performed at the own station's telephone set.

In light of the above, a prior art call signal detecting device has relied on an unsounding call signal detection circuit, a sounding call signal detection circuit, and an off-hook detection circuit which are independent of each other. The call signal detection circuits are each connected to a subscriber's line ahead of a switching contact which leads to a facsimile body, that is, at the central station side, while the off-hook detection circuit is connected to a lead-in loop leading to a telephone set. The unsounding call signal detector may comprise an amplitude limiting amplifier, a filter, and a detector which are cascaded with a secondary winding of a pickup transformer a primary winding of which is connected to a subscriber's loop via a dc cutoff capacitor. The unsounding call signal detector having such a construction detects the 1,300-hertz frequency signal in terms of an increase in the output level of the detector beyond a predetermined one. The sounding call signal detector, on the other hand, may comprise a relay connected to the subscriber's line via a full-wave rectifier, which is implemented by a diode bridge, and caused to respond to a rise of the output of the rectifier beyond a predetermined level by detecting a 16 hertz ac call signal.

Each of the call signal detectors is provided with a gate at its output side. The gate is disabled by an output of the off-hook detector responsive to off-hooking of the own station's telephone set and, thereby, prevented from malfunctioning in response to dial pulses associated with the own station's telephone set or multi-frequency (MF) signals. Meanwhile, since the detection of such incoming signals is effected in terms of the signal level, outputs of the detectors have to be fed to the facsimile apparatus independently of each other and, therefore, a 3-bit output port is required. In this manner, the prior art device is complicated in construction and cannot meet the increasing demand for a small-size construction.

Further, in the unsounding call signal detector, the unsounding call signal cannot be discriminated from an address signal generated by a push-button telephone set, or an MF signal, unless two discrete detector circuitries are provided at the output side of the amplitude limiting amplifier. Specifically, an output of the amplifier is routed through a band-pass filter to a detector on one hand and through a band-rejection filter to another detector on the other hand. A gate provides AND of the outputs of the two detectors to determine that an unsounding call signal has been detected only when the output of the band-pass filter side is high level and that of the band-rejection filter side is low level. Hence, where the incoming call signals have to be discriminated from MF signals, the construction becomes even more complicated and, especially, the filters need be highly accurate analog filters.

SUMMARY OF THE INVENTION

It is therefore an object of the present invention to provide a call signal detecting device which is capable of surely identifying signals without resorting to an intricate and highly advanced architecture.

It is another object of the present invention to provide a generally improved call signal detecting device.

A call signal detecting device of the present invention is connected to a telephone line together with a telephone set for identifying an unsounding call signal and a sounding call signal which are received over the telephone line. The call signal detecting device comprises a first binarizer for converting a frequency signal received over the telephone line to two binary levels, a second binarizer for converting a sounding call signal received over the telephone line to two binary levels in response to the sounding call signal, a selector for selectively delivering outputs of the first and second binarizers, and a signal identifying circuit for identifying an unsounding call signal and a sounding call signal by measuring a period of a signal delivered from the selector. The selector selects an output of the second binarizer when the second binarizer has received a sounding call signal.

In accordance with the present invention, in a facsimile communication system, a call signal detecting device for identifying call signals which are received over a network is provided. Both an unsounding call signal and a sounding call signal are detected by a single detection circuitry, which is also responsive to off-hooking of an own station's telephone set Detection of such signals is implemented by the measurement of a period which is performed by a processing unit, so that changes in the specifications of the signals to be detected can be accommodated merely by modifying a program of the processing system and not the hardware of the device.

The above and other objects, features and advantages of the present invention will become apparent from the following detailed description taken with the accompanying drawings.

BRIEF DESCRIPTION OF THE CRAWINGS

FIGS. 4A-4E show signal waveforms useful for describing the operations of the embodiments shown in FIGS. 1 and 2.

DESCRIPTION OF THE PREFERRED EMBODIMENTS

While the call signal detecting device of the present invention is susceptible of numerous physical embodiments, depending upon the environment and requirements of use, substantial numbers of the herein shown and described embodiments have been made, tested and used, and all have performed in an eminently satisfactory manner.

Figure 1:
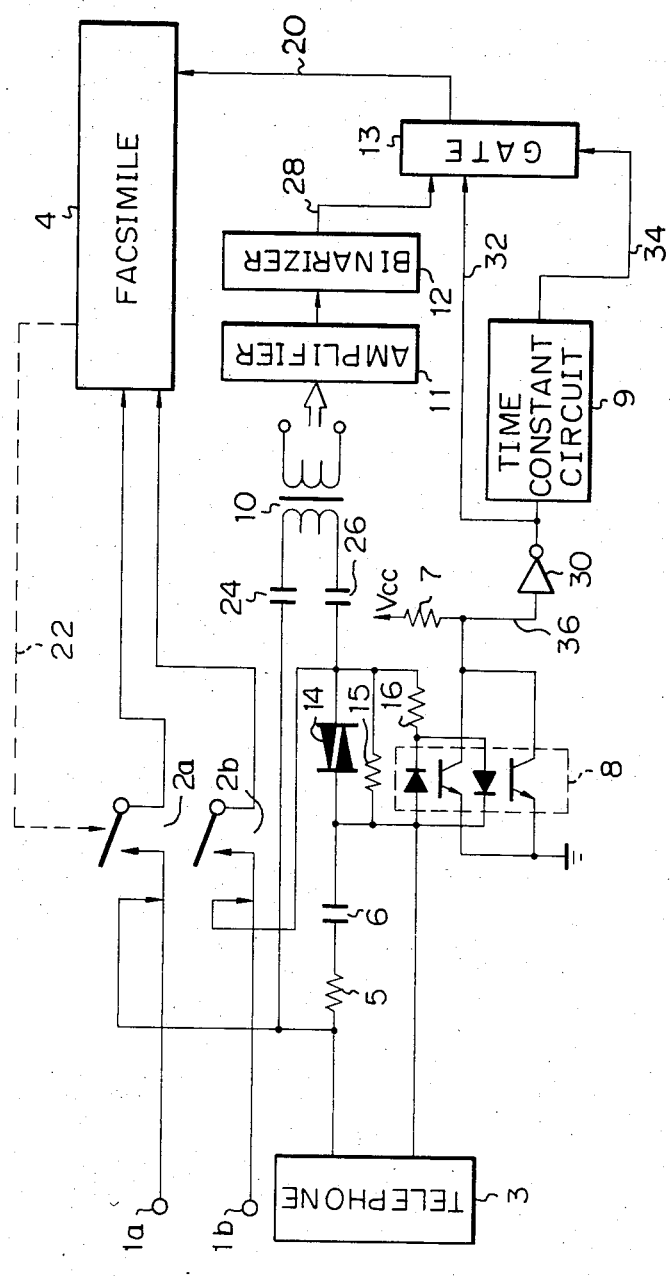
FIG. 1 is a block diagram of a call signal detecting device embodying the present invention.

Referring to FIGS. 1 of the drawings, a call signal detector in accordance with the present invention is shown. In this particular embodiment, the device is responsive to an unsounding call signal coming in through a subscriber's loop, or wires 1a and 1b, which is accommodated in a central office, a sounding call signal also coming in through the loop 1a and 1b and energized for one second and deenergized for the subsequent two seconds, and off-hooking of an own station's telephone set 3. The unsounding call signal may have a frequency of 1,300 hertz and the sounding call signal a frequency of 16 hertz, for example. The device instructs a facsimile body 4 the results of detection by way of a single output port 20, whereby a type of a facsimile apparatus at the calling subscriber's station as well as conditions of the connected network and operator are identified.

The wires 1a and 1b of the loop or line are connected to the telephone set 3 and facsimile body 4 via switching contacts 2a and 2b, respectively. In the illustrative embodiment, the switching contacts 2a and 2b are controlled by the facsimile body 4 as presented by a phantom line 22 such that the subscriber's loop, 1a and 1b, is led into the facsimile body 4 when a facsimile call has come in after the detection of a call signal and when a transmission start button has been operated to originate a facsimile call.

A primary winding of a pickup transformer 10 is connected to the subscriber's loop, 1a and 1b, via dc cut-off capacitors 24 and 26 at a point ahead of the switching contacts 2a and 2b, that is from the loop side. A secondary winding of the transformer 10 is connected to one input 28 of a gate 13 via an amplifier 11 and a binarizer 12. Applied to the binarizer 12 from the line, 1a and 1b, is a frequency signal which has been amplified by the transformer 10 and amplifier 11.

The binarizer 12 serves as a shaping circuit which, upon arrival of the above-mentioned frequency signal, produces at an output 28 a rectangular wave whose pulse width is associated with those parts of one of the opposite polarities of the input signal which exceed a threshold value. Specifically, when an unsounding call signal having a frequency of 1,300 hertz such as shown in FIG. 4C has been received over the line, 1a and 1b, there will appear at the output 28 of the binarizer 12 a rectangular wave 102 whose repetition frequency is also 1,300 hertz as shown in FIG. 4D. While the horizontal axis in each of FIGS. 4A-4D represents time, it should be noted that FIGS. 4A and 4B correspond in time axis to each other and so do the FIGS. 4C and 4D; the time axis of FIGS. 4A and 4B, those of FIGS. 4C and 4D and that of FIG. 4E do not correspondence to each other.

Referring again to FIG. 1, connected between the subscriber's line 1a and 1b, is a series connection of a diode side of a photocoupler 8 and a resistor 16 by way of a current limiting resistor 5 and a capacitor 6. As shown, a varistor 14 and a resistor 15 are each connected in parallel to the above-stated series connection.

As shown, the photocoupler 8 comprises two light emitting diodes (LEDs) connected opposite in polarity to each other, and two phototransistors optically coupled with the respective LEDs. Each of the phototransistors has an emitter connecting to ground and a collector connecting to a power source Vcc via a resistor 7. The collector is also connected to an inverter 30 which in turn is connected to a second input 32 of the previously mentioned gate 13 and to a third input 34 of the gate 13 via a time constant circuit 9.

As understood from the above, when an ac signal has arrived at the line, 1a and 1b, a current flows through the two diodes of the photocoupler 8 alternately to thereby turn on the two phototransistors alternately. As a result, the photocoupler 8 produces at the output 36 a rectangular wave which is associated with both of the opposite polarities of the incoming ac signal. For example, in response to a 16-hertz sounding call signal 104 shown in FIG. 4A, a rectangular wave 106 having a repetition frequency of 32 hertz as shown in FIG. 4B appears at the output 36 of the photocoupler 8. That is, the ac signal has its frequency multiplied and, then, produced as the rectangular wave.

The time constant circuit 9, which may comprise an ordinary capacitor-resistor (CR) circuit, is provided with a time constant which maintains the output 34 constantly high level while the above-mentioned 32-hertz rectangular wave is applied to the input.

The gate 13 gates a level of the input 28 when the input 34 is low level, and a level of the input 32 when the input 34 is high level, the gated level being fed out to the output 20. That is, the gate 13 is a circuit for selectively transferring signal levels of the inputs 28 and 32 to the output 20 in dependence upon the signal level of the input 34.

The output 20 of the gate 13 is coupled to the facsimile body 4. In this circuit arrangement, the facsimile body 4 by referencing a level of the output 20 sees the result of on-hook/off-hook detection associated with the own station's telephone set 3, unsounding call signal, sounding call signal, etc.

In operation, when a 1,300-hertz unsounding call signal 100 comes in through the subscriber's loop, 1a and 1b, which is activated from the central station, the binarizer 12 converts it to a rectangular wave 102 which shares the same repetition frequency with the incoming signal 100. At this instant, the output 34 of the time constant circuit 9 is still low level so that the gate 13 gates the rectangular wave 102 to the output 20.

Meanwhile, as a 16-hertz sounding call signal 104 comes in from the loop, 1a and 1b, which is activated by the central station, it renders the two phototransistors of the photocoupler 8 conductive alternately with the result that a rectangular wave 106 whose repetition frequency, 32 hertz, is two times higher than the frequency of the signal 104 appears at the collectors of the phototransistors. The rectangular wave 106 turns the output 34 of the time constant circuit 9 from low level to high level, whereby the gate 13 gates an inverted version of the rectangular wave 102 outputted from the inverter 30.

While the line, 1a and 1b, is in an idle state, that is, while the loop is disconnected and the own station's telephone set 3 is on-hook, no current flows through the diodes of the photocoupler 8 and no frequency signal is applied to the binarizer 12 via the transformer 10. In this condition, the output 20 of the gate 1 remains low level. As soon as the telephone set 3 is off-hooked such as at time $t_1$ shown in FIG. 4E, a current is caused to flow steadily through one of the diodes of the photocoupler 8 so that one of the phototransistors associated with the activated diode is steadily turned on. This makes the output 34 of the time constant circuit 9 high level with the result that the gate 13 gates a level on the output 32 of the inverter 30, a high level in this case, and applies it to the output 20. Afterwards, the output 20 will become low level again as soon as the telephone set 3 is on-hooked.

Summarizing the operation described so far, the output 20 of the gate 13 becomes steadily low level when the telephone set 3 is on-hook and steadily high level when it is off-hook. When a sounding call signal 104 arrives at the device over the line, 1a and 1b, a rectangular wave 106 which is a frequency-multiplied version of the signal 104 is routed to the facsimile body 4 via the output 20. Likewise, upon arrival of an unsounding call signal 100, a rectangular wave 102 equal in frequency to the signal 100 is routed to the facsimile body 4 via the output 20.

Figure 2:
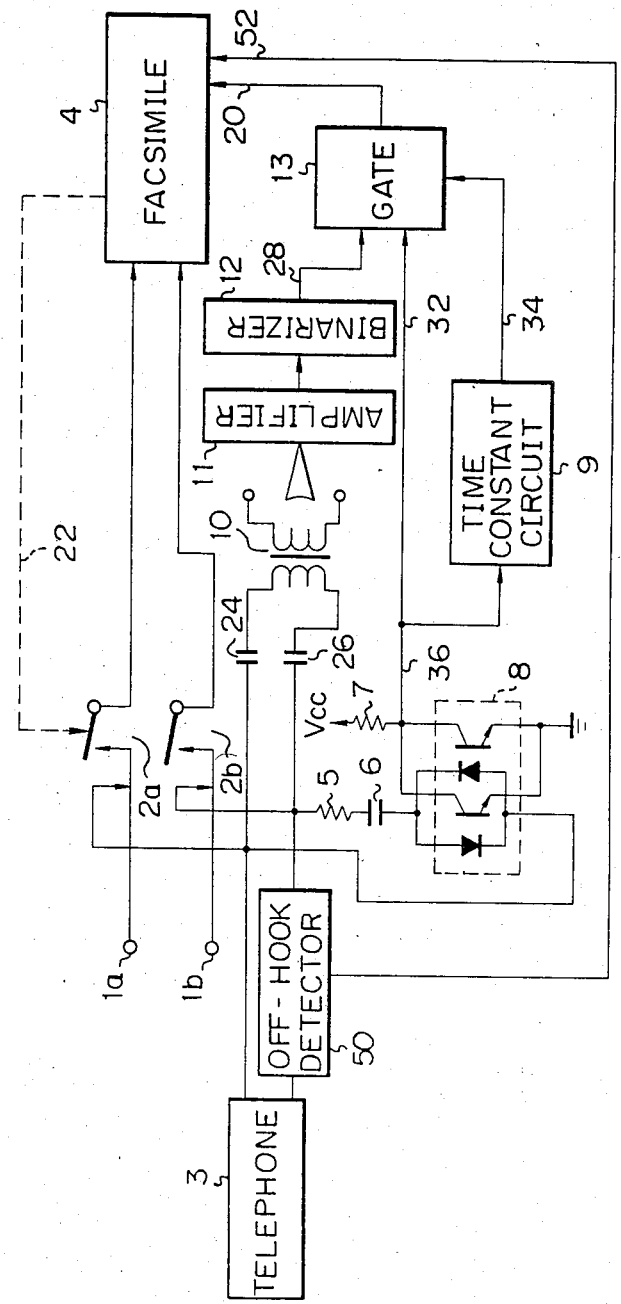
FIG. 2 is a block diagram showing another embodiment of the present invention.

Referring to FIG. 2, another embodiment of the device in accordance with the present invention is shown. In FIG. 2, the same or similar structural elements as those shown in FIG. 1 are designated by like reference numerals. The device of FIG. 2, like that of FIG. 1, detects a 1,300-hertz unsounding call signal 100 and a 16-hertz sounding call signal 104 but, unlike the latter, includes an off-hook detector circuit 50 responsive exclusively to off-hooking of the own station's telephone set 3. The device instructs the facsimile body the results of detection via an output port 52 as well as via the output port 20, thereby identifying a type of a facsimile apparatus at the calling subscriber's station, conditions of the connected network and operator.

In this particular embodiment, a series connection of the current limiting resistor 5, capacitor 6 and photocoupler 8 is connected to the subscriber's loop, 1a and 1b. The resistance of the resistor 5 is selected such that the 16-hertz high-voltage sounding call signal 104 coming in through the loop, 1a and 1b, causes a current to flow through the diodes of the photocoupler 8 to thereby render the associated phototransistors sufficiently conductive, while the 1,300-hertz unsounding call signal 100 is not reflected by the flow of a sufficiently large current through the diodes of the photocoupler 8 and, thereby, maintains the associated phototransistors non-conductive. The collector of each of the phototransistors is connected to the input 32 of the gate 13 and to the time constant circuit 9.

The off-hook detector circuit 50 is connected to one of the wires of the subscriber's loop, wire 1b in this embodiment, in order to sense a state of a hook switch which is associated with the telephone set 3. An output 52 of the circuit 50 is coupled to the facsimile body 4.

In operation, as the subscriber's loop, 1a and 1b, is activated by the central station to supply a 1,300-hertz unsounding call signal 100, it is converted by the binarizer 12 to a rectangular wave having the same repetition frequency as the call signal 100. Since the unsounding call signal 100 is sufficiently lower in signal level than a sounding call signal 104, the photocoupler 8 is not energized due to the presence of the current limiting resistor 5. Under this condition, the output 34 of the time constant circuit 9 remains low level allowing the rectangular wave 102 to be passed to the output 20 of the gate 13.

Meanwhile, when a 16-hertz sounding call signal has arrived over the loop, 1a and 1b, which is activated by the central station, it renders the phototransistors of the photocoupler 8 conductive alternately. As a result, a rectangular wave 106 whose repetition frequency is double the frequency of the signal 104, i.e., 32 hertz, is produced at the collectors of the phototransistors. The rectangular wave 106 turns the output 34 of the time constant circuit 9 from low level to high level, the rectangular wave 102 then being produced at the output 20 of the gate 13. That is, supposing that the signal 104 has a 1 second of continuation time and 2 seconds of interruption time, the control signal coupled to the gate 13 is switched accordingly so that the 32-hertz rectangular wave 106 appears as it is at the output 20 of the gate 13. At this instant, although an unexpected frequency signal is outputted from the binarizer 12, it will not be transferred to the output 20 because it is disconnected from the latter by the gate 13.

In any of the embodiments shown and described, a kind of an incoming call signal and which one of a telephone network and a facsimile communication network the incoming call signal has been propagated through can be determined by measuring at the facsimile body 4 a period, or frequency, of the rectangular wave appearing at the output 20 of the gate 13.

Also, in both of the illustrative embodiments, an address signal generated by the own station's telephone set 3 is clearly distinguished from the incoming call signal, whether it be sounding or unsounding. While dial pulses are generated at a rate of 10 pulses per second or 20 pulses per second, they are an intermittent sequence of one current polarity and, therefore, their frequency is not multiplied by the photocoupler 8. In contrast, the sounding call signal is an ac signal having opposite polarities and its frequency is increased to 32 hertz by the photocoupler 8; the resulting signal can be clearly distinguished from the dial pulses.

An unsounding call signal is a signal having a single frequency of 1,300 hertz, while a multi-frequency signal having frequencies of 1,336 hertz and 852 hertz in combination is measured as a random period concerning period measurement. Hence, they also can be surely discriminated from each other. It follows that an arrangement may be so made as to apply the output 20 of the gate 13 constantly to the facsimile body 4, with no regard to the output of the off-hook detector 50.

Figure 3:
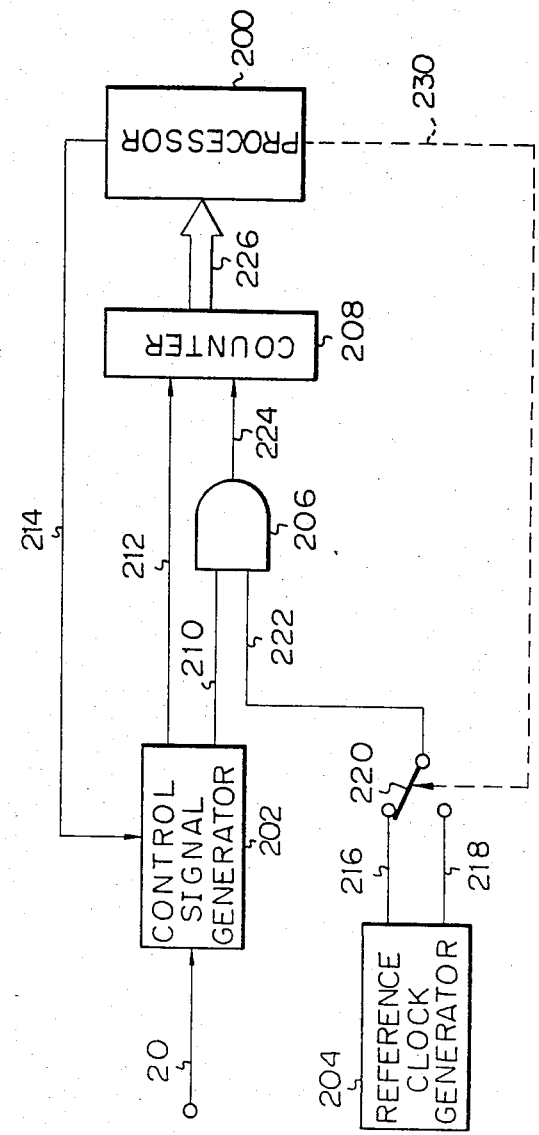
FIG. 3 is a block diagram of a signal period measuring function applicable to the present invention.

Referring to FIG. 3, there is shown in a block diagram a period measuring function assigned to the facsimile body 4. In this particular embodiment, the period measuring function implements the previously discussed call signal identifying function in cooperation with a microcomputer or like processing system 200, which bifunctions as a controller for controlling the entire system. As shown, the period measuring function is implemented by a control signal generator 202, a reference clock generator 204, an AND gate 206, and a counter 208.

The control signal generator 202 in response to an output 20 of the gate 13 delivers a gate signal over a lead 210 and a clear signal over a lead 212. The processing system, or processor, 200 applies a detection start command to the control signal generator 202 over a lead 214. The gate signal is produced by halving the frequency of the signal on the input 20, while the clear signal is a signal synchronous with every other negative-going edge of the signal on the input 20. The detection start command is fed from the processor 200, which is supervising the proceeding of a call, to the control signal generator 202 when it is necessary to measure the period of the input 20.

The reference clock generator 204 generates two different kinds of reference clocks each having a predetermined frequency which is sufficiently higher than those of the signals to be detected, the reference clocks being fed through leads 216 and 218, respectively. For example, one of the reference clocks higher in frequency than the other and appearing on the lead 216 is used to measure the period of a 1,300-hertz rectangular wave which will be applied the input 20 in the event of detection of an unsounding call signal, while the other reference having a lower frequency and appearing on the lead 218 is used to measure the period of a 32-hertz rectangular wave which will be applied to the input 20 during detection of a sounding call signal. In this construction, the single counter 208 having a predetermined number of counting stages is capable of detecting both the high frequency signal and the low frequency signal. The clocks are selectively coupled to a second input 222 of the AND gate 206 by a switch 220, which is controlled by the processor 200 through a control line 230.

The AND gate 206 produces the selected reference clock at an output 224 thereof only for a significant period of the gate signal which is also applied to the AND gate 206 from the control signal generator 202 over the lead 210. The counter 208 counts the clock pulses on the output 224 of the AND gate 206 and holds the resulting count. As soon as the processor 200 applies a detection start command to the control signal generator 202 over the lead 214, the control signal generator 202 delivers to the input 210 of the AND gate 206 a gate signal which is associated with the input signal on the signal line 20 and the counter 208 is activated. An output of the counter 208 is applied to the processor 200 over a signal line 226. The counter 208 is reset when the next clear signal has been applied thereto from the control signal generator 202 over the signal line 212. In such a construction, the processor 200 is allowed to measure the duration of a significant period of the gate signal and, eventually, the period of the received signal 104 or 100 as digital data.

After the receipt of the unsounding or sounding call signal has been detected by the above-stated period measuring procedure, the facsimile body 4 actuates the switches 2a and 2b so as to lead the subscriber's loop, 1a and 1b, into the facsimile body 4. Thereafter, a facsimile call proceeds according to a predetermined transmission control procedure.

In summary, it will be seen that the present invention provides a call signal detector which is simple in construction, requires only a small number of structural elements, elminates the need for highly accurate parts and, therefore, offers reliable operation and small-size construction. This unprecedented advantages is derived from a single detection circuitry which is capable of detecting both of sounding and unsounding call and even off-hooking of an own station's telephone set. Another advantage is that the delivery of data representative of results of detection inclusive of hook switch information to a facsimile body can be implemented by only one or two ports. In addition, since the detection of a signal is based on the measurement of a period which is assigned to a processing unit, any modification in the specifications of signals to be detected can be coped by the modification of software and not that of hardware, that is, by modifying a program of the processing system.

Various modifications will become possible for those skilled in the art after receiving the teachings of the present disclosure without departing from the scope thereof.

What is claimed is:

1. A call signal detecting device connected to a telephone line together with a telephone set for identifying an unsounding call signal and a sounding call signal which are received over the telephone line, said call signal detecting device comprising:
    first binarizer means for converting a frequency signal received over the telephone line to two binary levels and providing a first output;
    second binarizer means for converting a sounding call signal received over the telephone line to two binary levels and providing a second output;
    selector means for selectively delivering said outputs of said first and second binarizer means wherein the selector means selects said second output and the second binarizer means has received said sounding call signal; and
    signal identifying means for identifying an unsounding call signal and a sounding call signal by measuring a period of a signal delivered from said selector means.

2. A call signal detecting device as claimed in claim 1, wherein said second binarizer further includes a means for receiving an indication of off-hook of said telephone set and wherein the signal identifying means decides that the telephone set is off-hook when an output of said selector means maintains a predetermined one of the binary levels.

3. A call signal detecting device as claimed in claim 1, wherein the selector means includes a time constant circuit having a time constant which is at least on the same order as a period of the sounding call signal and causing the selector means to deliver an output of the second binarizer means over a period of time which is equal to the period of the sounding call signal.

* * * * *